(12) United States Patent
Maeda

(10) Patent No.: US 6,400,674 B1
(45) Date of Patent: Jun. 4, 2002

(54) SPINDLE MOTOR HOLDING STRUCTURE FOR AN OPTICAL DISK DRIVE

(75) Inventor: Tamotsu Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/217,184

(22) Filed: Mar. 23, 1994

(30) Foreign Application Priority Data

Mar. 25, 1993 (JP) ............................................. 5-089434

(51) Int. Cl.7 .............................................. G11B 17/00
(52) U.S. Cl. ..................................................... 369/247
(58) Field of Search .............................. 369/247, 244, 369/215, 219, 258, 263; 360/137, 98.07, 99.04, 99.08

(56) References Cited

U.S. PATENT DOCUMENTS 5,079,655 A * 1/1992 Yagi ........................ 360/97.02
5,416,762 A * 5/1995 Ohmori et al. ............ 369/75.2

FOREIGN PATENT DOCUMENTS

JP          4229480       *  8/1992

* cited by examiner

*Primary Examiner*—George J. Letscher
(74) *Attorney, Agent, or Firm*—Bell, Boyd & Lloyd LLC

(57) ABSTRACT

An optical disk drive comprises a spindle motor (5) and an optical pickup (9) provided with an objective lens (10) for focusing a light beam on an optical recording disk (1) held on a disk table which is driven for rotation by the spindle motor (5). The spindle motor (5) is disposed with its center axis ($P_2$) of vibration inclined at an angle ($\Delta\theta$) to a reference scanning line ($P_1$) intersecting the center axis of the spindle motor (5) and the optical axis of the objective lens (10). Since the center axis ($P_2$) of vibration is inclined at an angle ($\Delta\theta$) to the reference scanning line ($P_1$), the adverse effect of the resonant vibrations of the spindle motor (5) on the operation of the optical disk drive for focusing a light beam on the optical recording disk (1) and positioning the objective lens (10) for tracking is reduced.

5 Claims, 8 Drawing Sheets

SPINDLE MOTOR HOLDING STRUCTURE FOR AN OPTICAL DISK DRIVE

BACKGROUND OF THE INVENTION

1. Field of the Invention

The present invention relates to an optical disk drive provided with an optical pickup for recording information on and reproducing information recorded on an optical recording medium, such as an optical disk or a magnetooptical disk, and, more particularly, to an improved spindle motor holding structure for holding a spindle motor for driving an optical recording medium for rotation on the chassis of an optical disk drive.

2. Description of the Related Art

FIGS. 4 to 6 illustrate an optical disk drive disclosed in Japanese Patent Laid-open (Kokai) No. 4-229480 provided with an improved spindle motor holding structure. In this known optical disk drive, a disk cartridge 2 containing an optical recording disk 1, such as an optical disk or a magnetooptical disk, is placed in a horizontal position on four positioning pins 4 so that the optical recording disk 1 is attracted magnetically in a horizontal position to a disk table 7 which is driven for rotation by the spindle 6 of a spindle motor 5 held on a main chassis 3. The optical recording disk 1 is located close to the objective lens 10 of an optical pickup 9 which is shifted by a voice coil motor 8.

While the disk table 7 is rotated together with the optical recording disk 1 by the spindle motor 5, the objective lens 10 of the optical pickup 9 is moved along a reference scanning line $P_1$ crossing the center axis of the spindle 6 and the center axis of the objective lens 10 by the voice coil motor 8 to record information on the optical recording disk 1 or to reproduce recorded information from the optical recording disk 1.

A cartridge holder, not shown, for holding the disk cartridge 2 in a horizontal position therein, and a main slider, not shown, for vertically translating the cartridge holder are mounted on the main chassis 3.

As shown in FIG. 4, a loading motor 11 and a loading mechanism 12 that converts the rotative driving force of the loading motor 11 into linear driving force to drive the main slider for linear movement are mounted on the main chassis 3. As shown in FIGS. 4 and 5, the loading motor 11 drives the loading mechanism 12 to place the disk cartridge 2 automatically on the positioning pins 4.

The main chassis 3 is provided with a large opening 14 and a substantially rectangular frame 15 fastened to the main chassis 3 with a plurality of screws 16 screwed in the main chassis 3 from under the main chassis 3. The spindle motor 5 and the voice coil motor 8 are fastened to the lower surface of the frame 15 with screws.

As shown in FIGS. 5 and 6, the spindle 6 of the spindle motor 5 is held in a vertical position for rotation at the center of the disk-shaped stator yoke 51 so as to project from the upper surface of the stator yoke. A cylindrical disk table 7 is integrally provided with a cylindrical rotor yoke 52 and mounted on the spindle 6 by press fit or the like. A chucking magnet 53 is fixedly mounted on the spindle 6 within the disk table 7.

The stator yoke 51 is integrally provided with a substantially semicircular mounting flange 54 provided with three through holes 56a, 56b and 56c at its middle and opposite ends, respectively, and has a substantially semicircular unflanged part 55.

As shown in FIG. 5, the upper part of the spindle motor 5 is inserted in one end of the frame 15 with the unflanged part 55 provided with the mounting flange part 54 facing the optical pickup 9 and three screws 17a, 17b and 17c are screwed respectively through the three through holes 56a, 56b and 56c in the frame 15 to fasten the mounting flange 54 to the lower surface of the frame 15.

As shown in FIG. 4 and 5, the optical pickup 9 has a two-axis device 92 mounted on a carriage 91 and the objective lens 10 is mounted on top of the two-axis device 92. Four guide rollers 94 supported on the four corners of the carriage 91 roll along a pair of horizontal, parallel guide shafts 93a and 93b so that the carriage 91 is able to move horizontally in the directions of a and b. An optical unit 95 which emits a light beam, such as a laser beam, toward the objective lens 10 and receives a light beam is disposed on one side of the optical pick up 9 farther from the spindle motor 5.

As shown in FIGS. 4 and 5, the voice coil motor 8 comprises a pair of yokes 81a and 81b parallel to the pair of guide shafts 93a and 93b, magnets 82a and 82b, and coils 83a and 83b fixedly mounted respectively on the opposite ends of the carriage 91.

The pair of guide shafts 93a and 93b and the yokes 81a and 81b are inserted in the frame 15 from under the same and fastened to the lower surface of the frame 15 with a pair of screws 18a and 18b and a pair of screws 19a and 19b. The optical unit 95 is fastened to the lower surface of the main chassis 3 and the frame 15 with a plurality of screws 20.

A light beam emitted by the optical unit 95 toward the objective lens 10 of the optical pickup 9 is directed by the objective lens 10 so as to fall perpendicularly on the lower surface of the optical recording disk 1, while the pair of coils 83a and 83b of the voice coil motor 8 are energized to move the carriage 91 in the direction of the arrow a or b along the pair of guide shafts 93a and 93b by the electromagnetic action of a magnetic circuit formed by the pair of coils 83a and 83b, the yokes 81a and 81b, and the magnets 82a and 82b. The light beam projected through the objective lens 10 scans the optical recording disk 1 along the reference scanning line $P_1$ to record information on or to reproduce recorded information from the optical recording disk 1.

The two-axis device 92 of the optical pickup 9 moves the objective lens 10 to adjust the position of the light beam projected through the objective lens 10 for focusing and tracking.

The unflanged part 55 of the spindle motor 5 is essential to enable the carriage 91 to approach the center of the optical recording disk 1 closely in the direction of the arrow a so that the light beam projected through the objective lens 10 is able to scan the tracks near the inner circumference of the optical recording disk 1.

Since the mounting flange 54 is formed in a substantially semicircular shape to form the unflanged part 55, the mounting flange 54 is fastened to the frame 15 with the three screws 17a, 17b and 17c. Consequently, as shown in FIG. 6, the spindle motor 5 is liable to vibrate about a Y-axis perpendicular to a vertical Z-axis parallel to the center axis of the spindle 6 in the directions of the arrows c and d in a vertical plane including the vertical Z-axis and a horizontal X-axis, which is a center axis $P_2$ of vibration of the spindle motor 5 included in a horizontal plane including the Y-axis.

The vibration of the axis of the spindle motor 5 in the directions of the arrows c and d is magnified at the periphery of the optical recording disk 1 magnetically attracted to the disk table 7.

In this known optical disk drive, the spindle motor 5 is disposed with its center axis $P_2$ of vibration aligned with the reference scanning line $P_1$ so that the unflanged part 55 of the spindle motor 5 is bisected by the reference scanning line $P_1$.

The screw 17a fastening the middle part of the mounting flange 54 to the frame 15 is on the center axis $P_2$ of vibration, and the screws 17b and 17c are positioned on the Y-axis dislocated from an axis parallel to the Y-axis and crossing the center axis of the spindle 6 of the spindle motor 5 toward the optical pickup 9 by a greatest possible distance L to stabilize the spindle motor 5 on the frame 15.

However, this known optical disk drive has the following problems.

FIGS. 7A and 7B are analytic resonance diagrams produced through the computer analysis of the mode of resonant vibration of the spindle motor 5 fastened at the three points to the frame 15 caused by an exciting vibration applied to the frame 15. As is evident from FIG. 8, resonance peaks as shown in FIGS. 7A and 7B appeared at frequencies of about 1476 Hz and about 3274 Hz.

In this state, directions of the resonant vibrations of the spindle motor 5 coincided with the directions of the arrows c and d in a vertical plane including the center axis $P_2$ of vibration shown in FIG. 6.

Although the spindle motor 5 is liable to resonate to the exciting vibration along the center axis $P_2$ of vibration, the center axis $P_2$ of vibration is aligned with the reference scanning line $P_1$ along which the objective lens 10 moves for scanning. Consequently, the resonant vibrations along the directions of the arrows c and d included in a vertical plane including the center axis $P_2$ of vibration of the spindle motor 5 entails the magnified vibration of the optical recording disk 1 relative to the objective lens 10 in the directions of the arrows c and d included in the vertical plane including the center axis $P_2$ of vibration, which influences greatly the performance of the optical disk drive in focusing the light beam on the optical recording disk 1 and positioning the objective lens 10 for tracking, and deteriorates the recording/reproducing accuracy of the optical disk drive.

Furthermore, in an optical disk drive of this type, the voice coil motor 8 and the optical pickup 9 are rarely symmetrical with respect to the reference scanning line $P_1$ as shown in FIG. 5, and, in most cases, the interval $S_1$ between the guide shaft 93a and the reference scanning line $P_1$ and the interval $S_2$ between the other guide shaft 93b and the reference scanning line $P_1$ are different from each other.

Nevertheless, the screws 17b and 17c fastening the opposite ends of the mounting flange 54 of the spindle motor 5 to the frame 15 are disposed symmetrically with respect to the center axis $P_2$ of vibration on the Y-axis at the distance L from the line parallel to the Y-axis and crossing the center axis of the spindle motor 5. Consequently, the screw 18a fastening one end nearer to the spindle motor 5 of the guide shaft 93a disposed at the smaller interval $S_1$ from the reference scanning line $P_1$ to the frame 15, and the screw 17b fastening one end of the mounting flange 54 to the frame 15 are inevitably excessively close to each other.

SUMMARY OF THE INVENTION

The present invention has been made to solve the foregoing problems in the known optical disk drive and it is therefore an object of the present invention to provide an optical disk drive incorporating an improved spindle motor holding structure capable of reducing the adverse influence of the resonant vibration of a spindle motor held thereon on the operation of the optical disk drive for focusing a light beam projected through an objective lens on the optical recording disk and for positioning the objective lens relative to the optical recording disk for tracking.

With the foregoing object in view, the present invention provides an optical disk drive comprising a spindle motor having a spindle for driving a disk table for rotation, an optical pickup having an objective lens, and a voice coil motor for moving the objective lens. A center line of vibration crossing the center axis of the spindle of the spindle motor is inclined in a horizontal plane including the center line of vibration to a reference scanning line intersecting the center axis of the spindle and the optical axis of the objective lens of the optical pickup.

Preferably, the mounting flange of the spindle motor is formed in a substantially semicircular shape to form a substantially unflanged part on one side thereof facing the optical pickup. The center axis of vibration is inclined to the reference scanning line so that the substantially semicircular unflanged part is asymmetrical with respect to the reference scanning line, and the substantially semicircular mounting flange is fastened at three points to a chassis with screws.

Since the center axis of vibration of the spindle motor is inclined to the reference scanning line along which the objective lens of the optical pickup is moved, the influence of the vibration of the optical recording disk along the center axis of vibration of the spindle motor due to resonance relative to the objective lens on the operation of the optical disk drive for focusing the light beam projected through the objective lens on the optical recording disk and for positioning the objective lens relative to the optical recording disk for tracking is comparatively insignificant, so that the light beam can be comparatively accurately focused on the optical recording disk and the objective lens can be comparatively accurately positioned for tracking for recording/reproducing operation with high accuracy. Since the unflanged part, hence the mounting flange, of the spindle motor is asymmetrical with respect to the reference scanning line, the screws fastening the opposite ends of the mounting flange to the chassis will not interfere with screws fastening the optical pickup and the flange of the voice coil motor to the chassis. The present invention is capable of employing the conventional spindle motor without any modification.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 3:
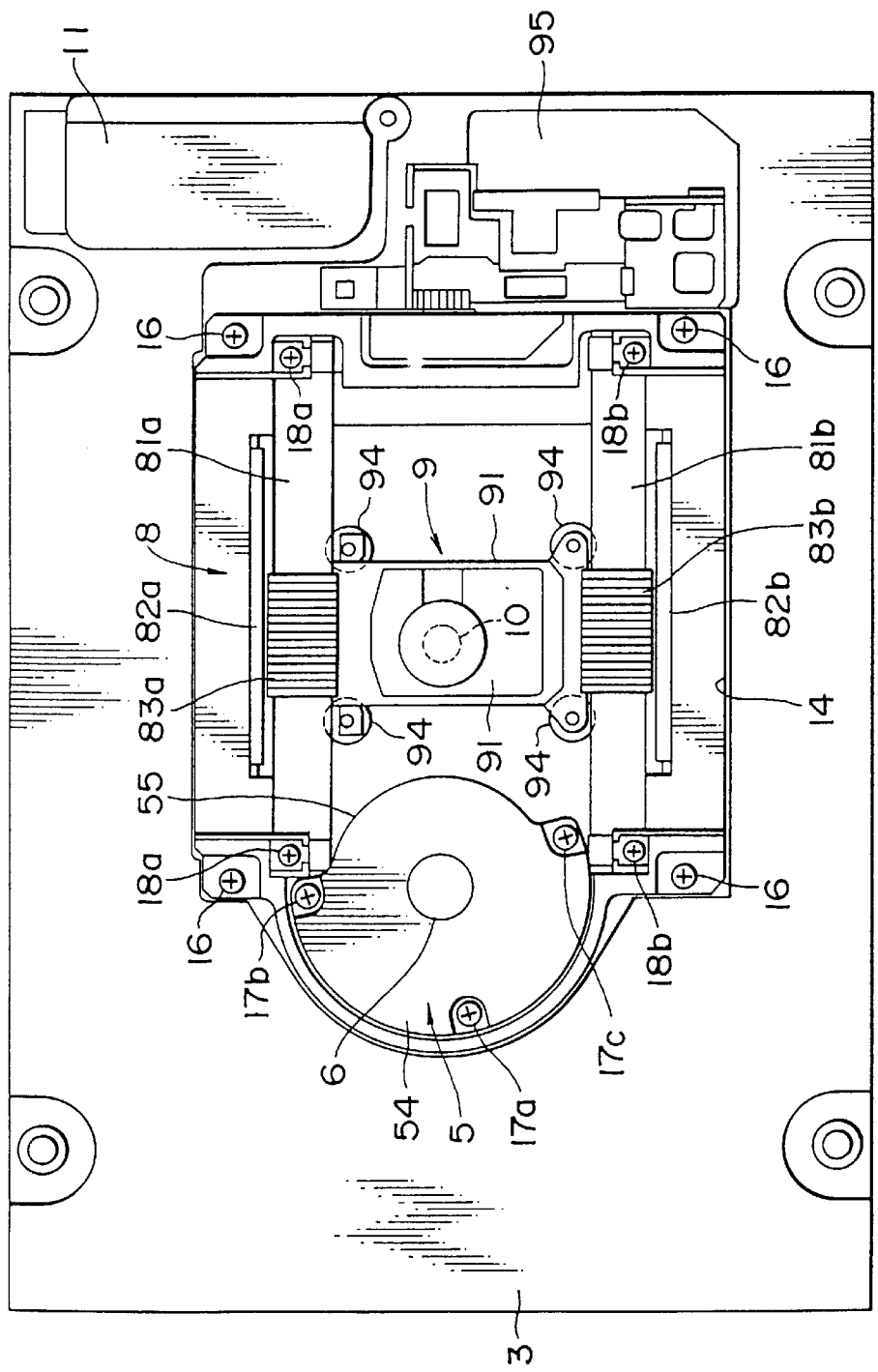
FIG. 3 is a bottom view of the main chassis of the optical disk drive of FIG. 1.
Figure 4:
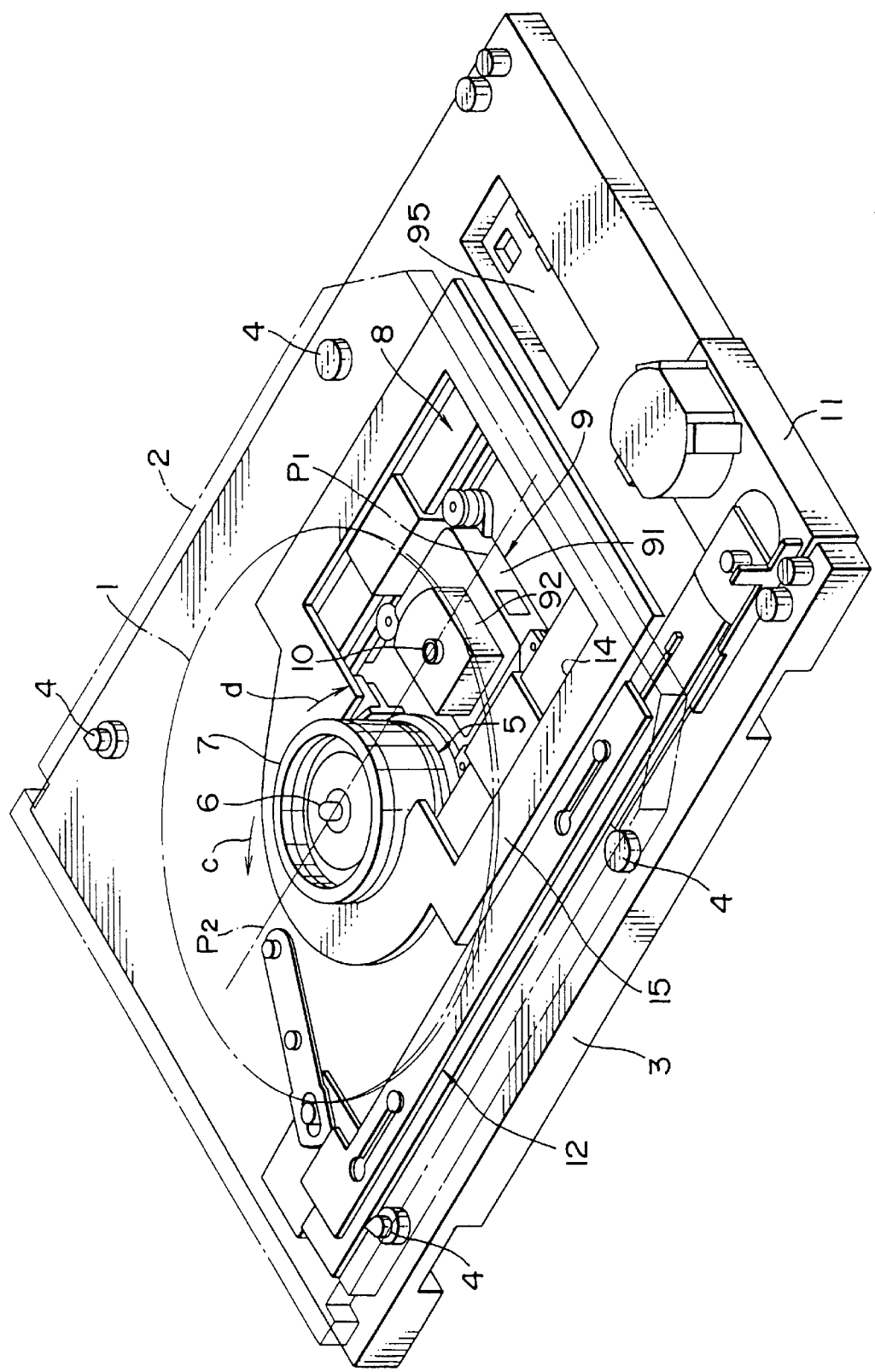
FIG. 4 is a top view in perspective of a main chassis and parts mounted on the same of a known optical disk drive.
Figure 5:
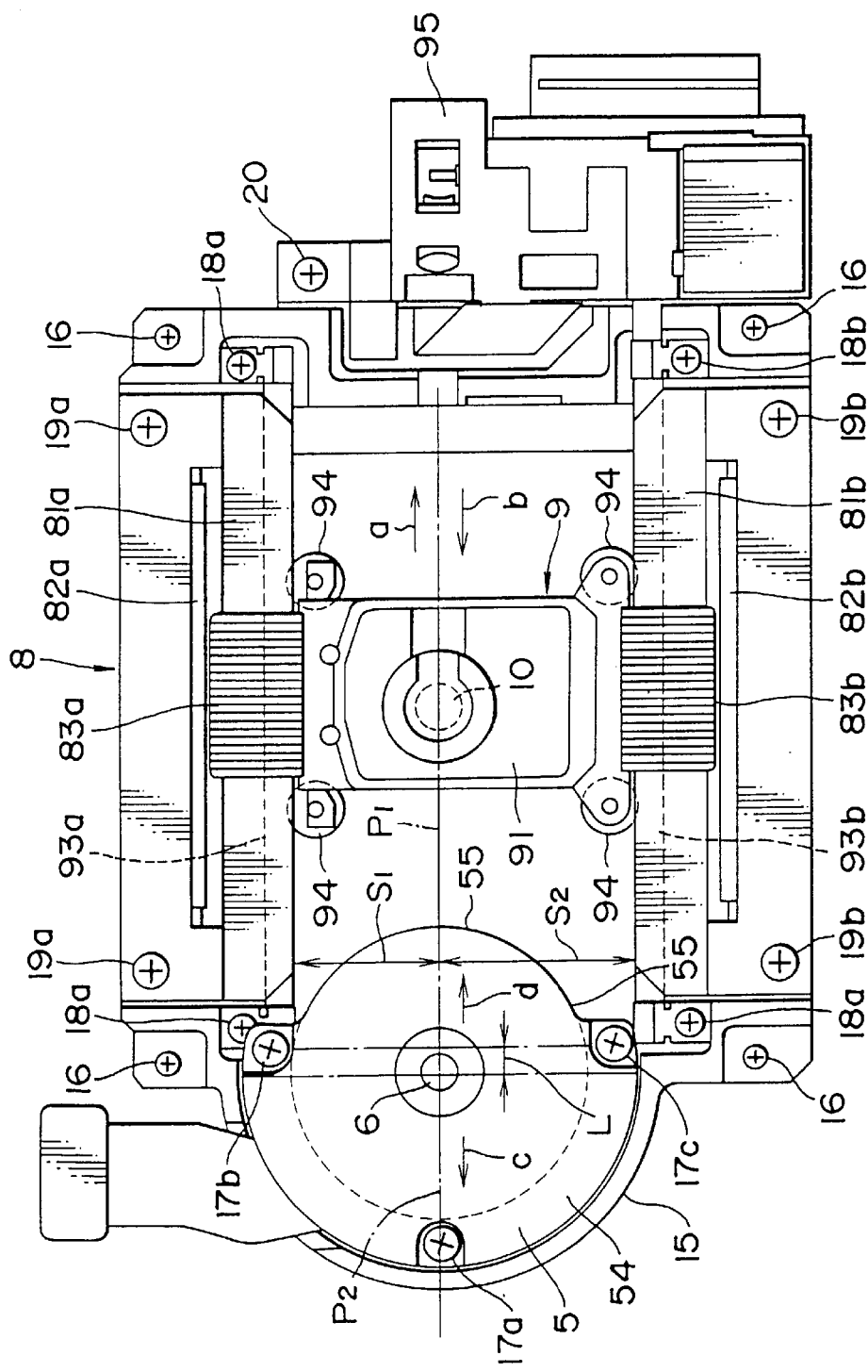
FIG. 5 is a bottom view of a frame holding a spindle motor of the known optical disk drive.
Figure 6:
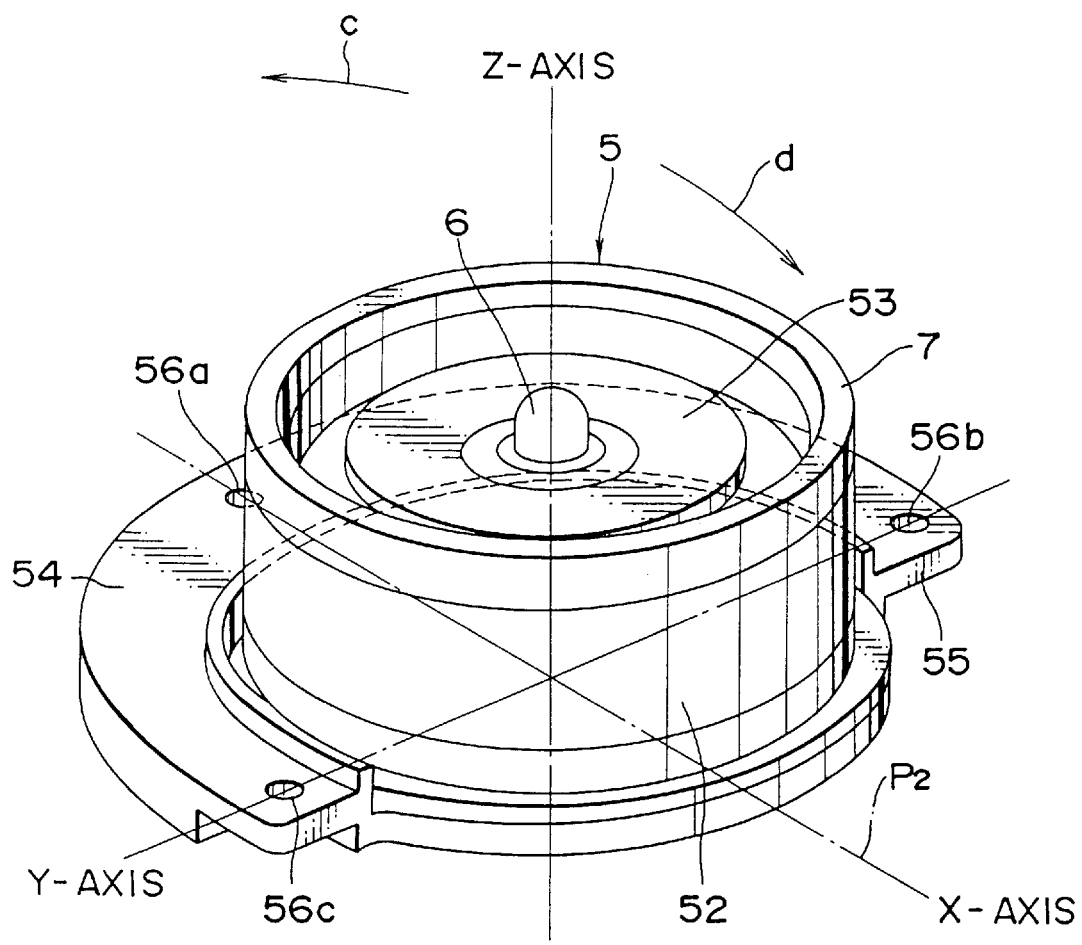
FIG. 6 is a perspective view of a spindle motor of the known optical disk drive.
Figure 7A:
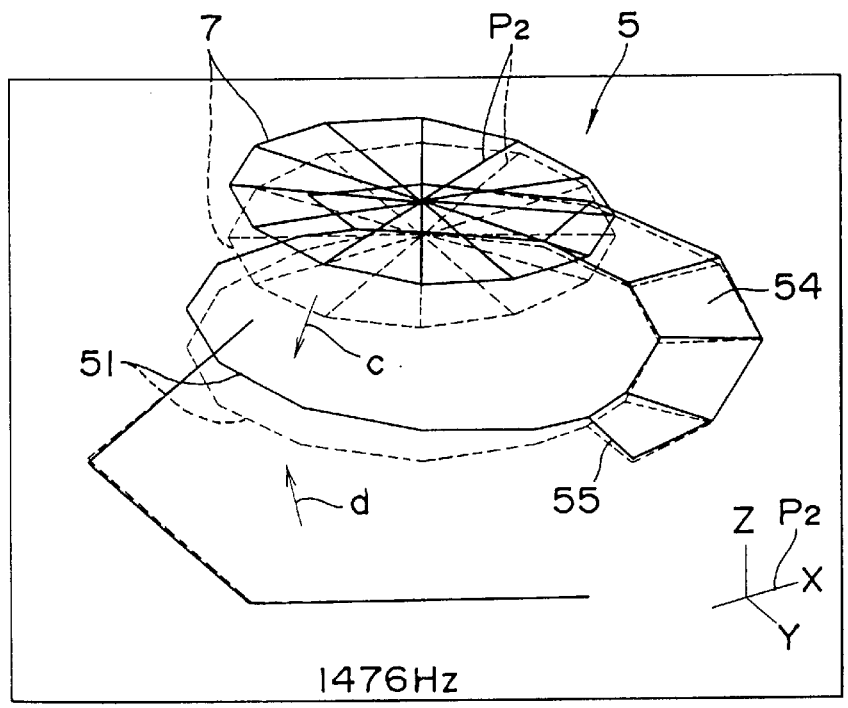
FIGS. 7A and 7B are analytic resonance diagrams produced through the computer analysis of the mode of vibration of the spindle motor of FIG. 6 on the known optical disk drive.
Figure 7B:
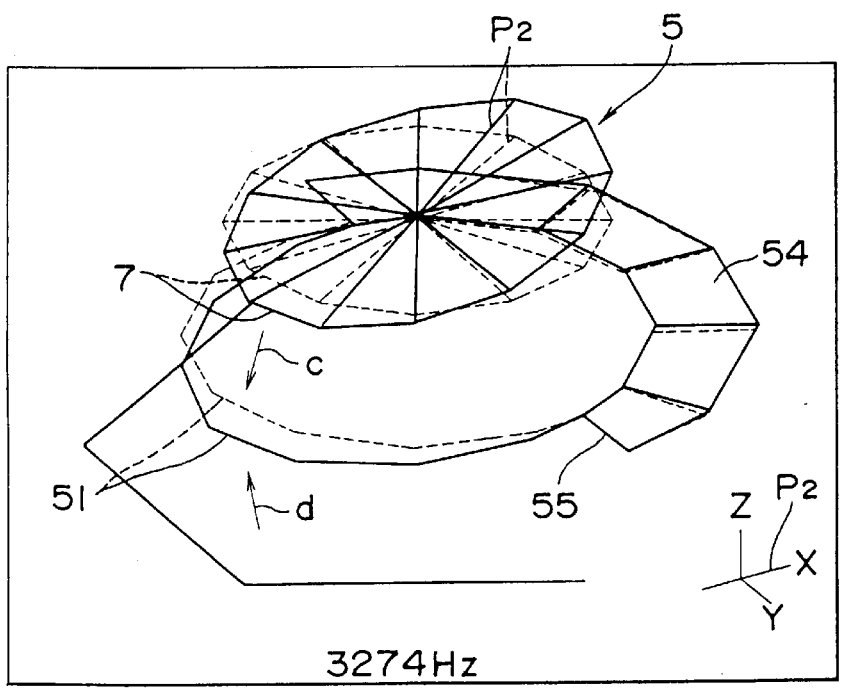
Figure 8:
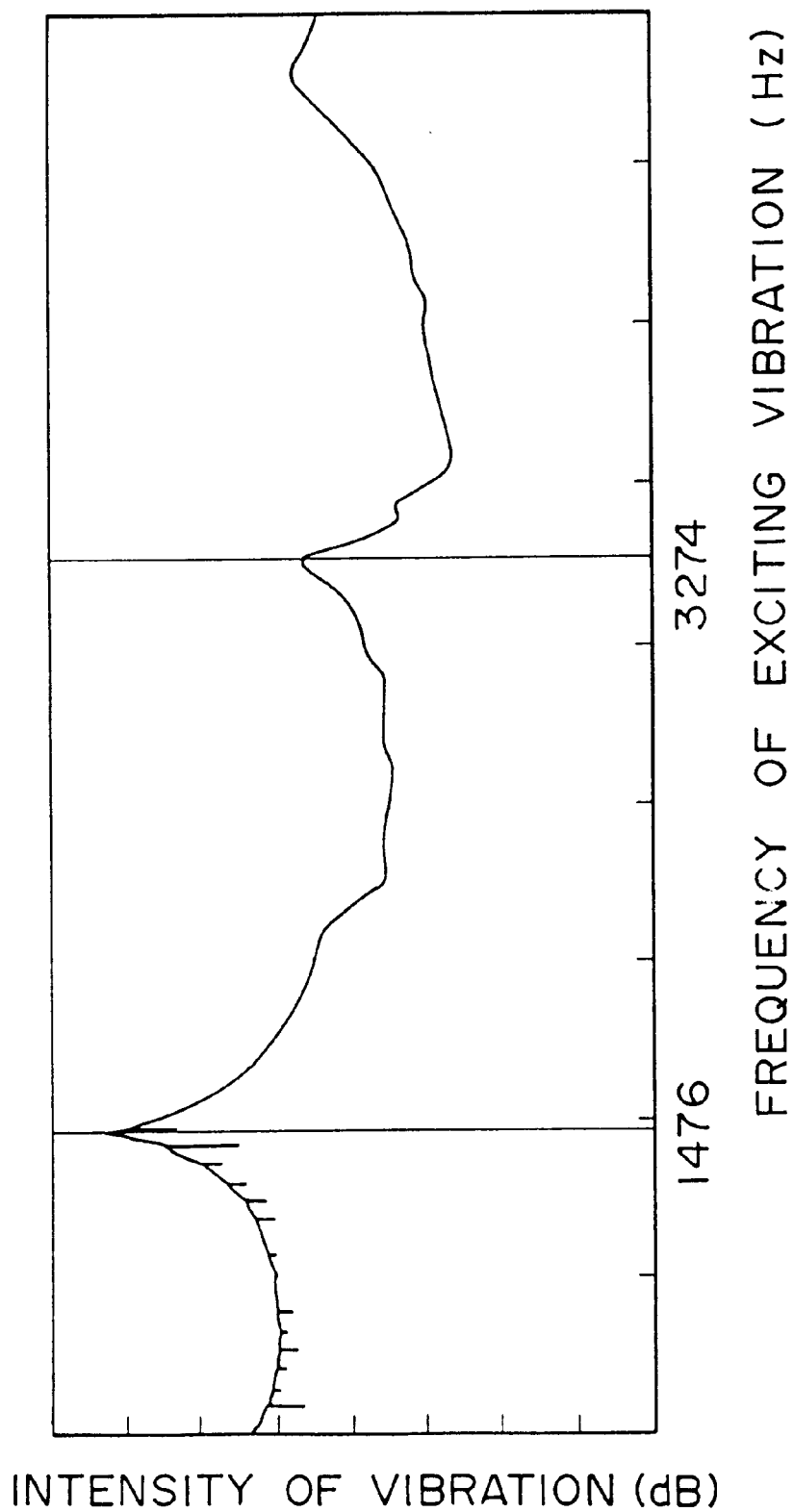
FIG. 8 is a graph showing the variation of the intensity of vibration of the spindle motor of FIG. 6 on the known optical disk drive with the frequency of exciting vibration.

An optical disk drive in a preferred embodiment according to the present invention will be described with reference to FIGS. 1 to 3, in which parts like or corresponding to those shown in and previously described with reference to FIGS. 4 to 6 are denoted by the same reference characters and the description thereof will be omitted to avoid duplication.

The optical disk drive embodying the present invention is provided with a spindle motor 5 identical with that shown in FIG. 6.

Figure 1:
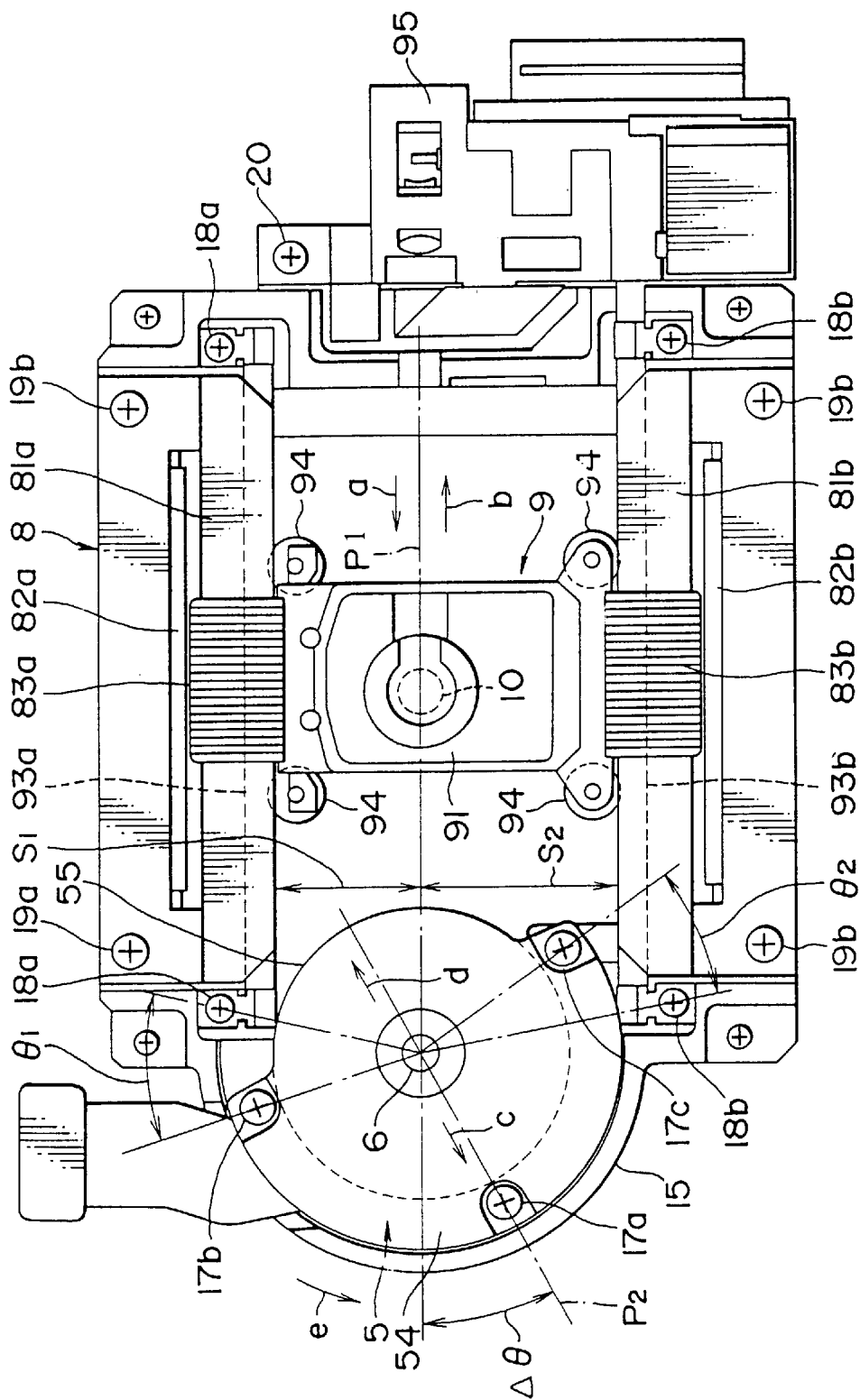
FIG. 1 is a bottom view of an optical disk drive in a preferred embodiment according to the present invention.
Figure 2:
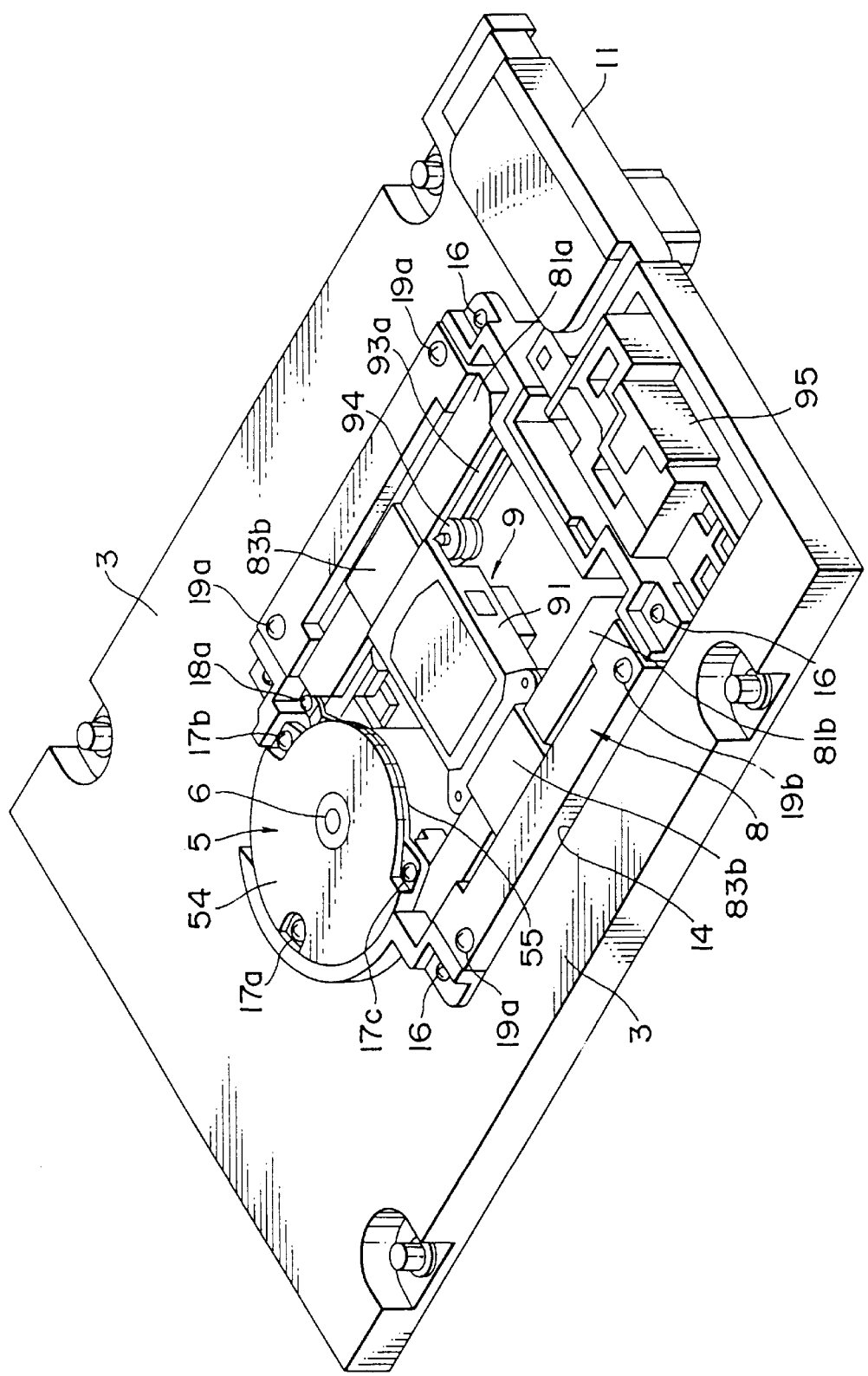
FIG. 2 is a perspective view of the optical disk drive of FIG. 1, taken from the side of the bottom surface of a main chassis.

As shown in FIGS. 1 to 3, the mounting flange 54 of the spindle motor 5 is fastened to the lower surface of the frame 15 at three points with three screws 17a, 17b and 17c with the center line $P_2$ of vibration inclined at an angle $\Delta\theta$ to the reference scanning line $P_1$. The flange 54 can be set at this angular position relative to the reference scanning line $P_1$ by turning the spindle motor 5 about its axis in the direction of the arrow e through the angle $\Delta\theta$ from the angular position of the spindle motor 5 of the previously described known optical disk drive relative to the reference scanning line $P_1$.

Even if the optical recording disk 1 is vibrated in the directions of the arrows c and d by the resonant vibrations of the spindle motor 5 in the directions of the arrows c and d, effective vibrations of the optical recording disk 1 adversely affecting the operation of the optical disk drive for focusing the light beam on the optical recording disk 1 and for positioning the objective lens 10 relative to the optical recording disk 1 for tracking is less than the vibrations in the directions of the arrows c and d by a factor corresponding to the angle $\Delta\theta$ because the center line $P_2$ of vibration of the spindle motor 5 is inclined at the angle $\Delta\theta$ to the reference scanning line $P_1$ in a horizontal plane.

Consequently, the operation of the optical disk drive for focusing the light beam on the optical recording disk and positioning the light beam for tracking can be stably carried out, so that highly accurate recording/reproducing operation can be achieved.

Since the spindle motor 5 is fastened to the lower surface of the frame 15 with the center line $P_2$ of vibration inclined at the angle $\Delta\theta$ to the reference scanning line $P_1$, the screw 17b fastening one end of the mounting flange 54 on the side of the guide shaft 93a extended at the smaller interval $S_1$ from the reference scanning line $P_1$ is separated by a sufficiently large distance from the screw 18a fastening one end of the guide shaft 93 on the side of the spindle motor 5.

Thus, the screws 17b and 18a are separated from each other by a distance corresponding to an angle $\theta_1$ between a line intersecting the center axis of the spindle motor 5 and the center axis of the screw 17a and a line intersecting the center axis of the spindle motor 5 and the center axis of the screw 18a, and the screws 17c and 18b are separated from each other by a distance corresponding to an angle $\theta_2$ between a line intersecting the center axis of the spindle motor 5 and the center axis of the screw 17c and a line intersecting the center axis of the spindle motor 5 and the center axis of the screw 18b, so that the screws 17b, 17c will not interfere with the screws 18a and 18b, respectively.

Since the optical disk drive of the present invention employs the spindle motor 5 identical with that of the known optical disk drive, the optical disk drive of the present invention is substantially the same in construction as the known optical disk drive.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An optical disk drive comprising:
a spindle motor for driving an optical recording disk for rotation, the spindle motor having a center axis;
an optical pickup including an objective lens having an optical axis, the objective lens being movable along a reference scanning line; and
a spindle motor holding structure that holds the spindle motor, the spindle motor holding structure having a center axis of vibration of the spindle motor inclined at an angle relative to the reference scanning line, the center axis of vibration also being in a plane perpendicular to the center axis of the spindle motor.

2. An optical disk drive comprising:
a spindle motor for driving an optical recording disk for rotation, the spindle motor having a center axis;
an optical pickup including an objective lens having an optical axis, the objective lens being movable along a reference scanning line;
a spindle motor holding structure that holds the spindle motor, the spindle motor holding structure having a center axis of vibration of the spindle motor inclined at an angle relative to the reference scanning line, the center axis of vibration also being in a plane perpendicular to the center axis of the spindle motor; and
a frame;
the spindle motor having a substantially semicircular unflanged part and a substantially semicircular mounting flange fastened to the frame, the mounting flange being fastened to the frame so that the unflanged part of the spindle motor faces the optical pickup and the unflanged part is asymmetrical with respect to the reference scanning line.

3. An optical disk drive comprising:
a spindle motor for driving an optical recording disk for rotation, the spindle motor having a center axis;
an optical pickup including an objective lens having an optical axis, the objective lens being movable along a reference scanning line;
a spindle motor holding structure that holds the spindle motor, the spindle motor holding structure having a center axis of vibration of the spindle motor inclined at an angle relative to the reference scanning line, the center axis of vibration also being in a plane perpendicular to the center axis of the spindle motor; and
a frame;
the spindle motor having a substantially semicircular mounting flange fastened to the frame, the mounting flange being fastened to the frame with a plurality of screws so that the mounting flange is asymmetrical with respect to the reference scanning line.

4. The optical disk drive according to claim 3, wherein:
the mounting flange is fastened at three points on a circle to the frame with three screws.

5. An optical disk drive comprising:
a spindle motor for driving an optical recording disk, the spindle motor having a center axis;
an optical pickup including an objective lens having an optical axis, the objective lens being movable along a reference scanning line; and
means for holding the spindle motor so that a center axis of vibration of the spindle motor is inclined at an angle relative to the reference scanning line.

* * * * *